Dec. 25, 1956 G. R. WHITTENBERG 2,775,077
WORK SUPPORTING MEANS FOR CENTERLESS GRINDERS
Filed Jan. 30, 1956 3 Sheets-Sheet 1

INVENTOR.
GEORGE R. WHITTENBERG
BY Louis Chayka
ATTORNEY

Dec. 25, 1956   G. R. WHITTENBERG   2,775,077
WORK SUPPORTING MEANS FOR CENTERLESS GRINDERS
Filed Jan. 30, 1956   3 Sheets-Sheet 2
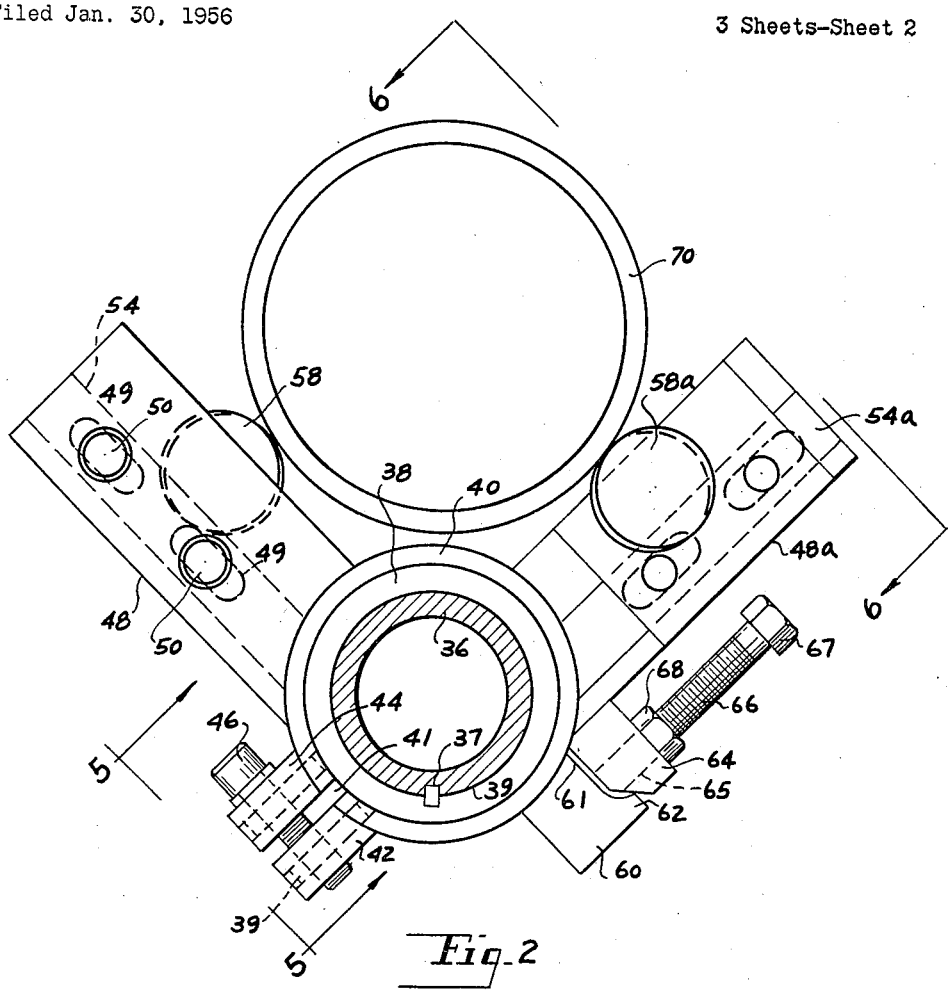
Fig. 2
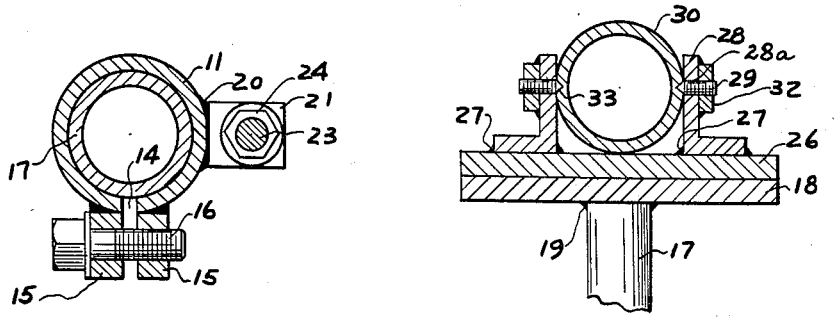
Fig. 3
Fig. 4
INVENTOR.
GEORGE R. WHITTENBERG
BY
Louis Chayka
ATTORNEY Dec. 25, 1956   G. R. WHITTENBERG   2,775,077
WORK SUPPORTING MEANS FOR CENTERLESS GRINDERS
Filed Jan. 30, 1956   3 Sheets-Sheet 3

INVENTOR.
GEORGE R. WHITTENBERG.
BY Louis Chayka
ATTORNEY 2,775,077
Patented Dec. 25, 1956

2,775,077

WORK SUPPORTING MEANS FOR CENTERLESS GRINDERS

George R. Whittenberg, Detroit, Mich.

Application January 30, 1956, Serial No. 562,080

6 Claims. (Cl. 51—236)

The invention pertains to a fixture composed of two units, one of which is adapted to support oblong objects such as tubes and similar cylindrical work pieces which are fed towards a centerless grinder for an operative action on the surface of said work pieces, while another unit serves to support said work pieces as they are moved outwardly from the grinder after the surface grinding operation thereon has been completed.

The object of the invention is to provide a fixture for use with a centerless grinder which fixture will be capable of supporting work pieces of considerable length and weight, and of various diameters, and which will include means facilitating the axial movement of a work piece towards the grinder and the rotary movement of the work piece about its axis. While centerless grinders are generally provided with means to effect both said movements, the function of such means becomes less effective when the work pieces are of considerable length and weight. It is in such cases especially, that the fixture has proved itself productive of most desirable results.

A further object of the invention is to include in the fixture means whereby the operative parts of the fixture for support of a work piece of a specific diameter may be adjusted promptly and secured against displacement.

I shall now describe by improvement with reference to the accompanying drawings in which:

Fig. 2 is a sectional view on line 2—2 of Fig. 1;

Fig. 3 is a sectional view on line 3—3 of Fig. 1;

Fig. 4 is a sectional view on line 4—4 of Fig. 1;

Similar numerals refer to similar parts throughout the several views.

Figure 1:
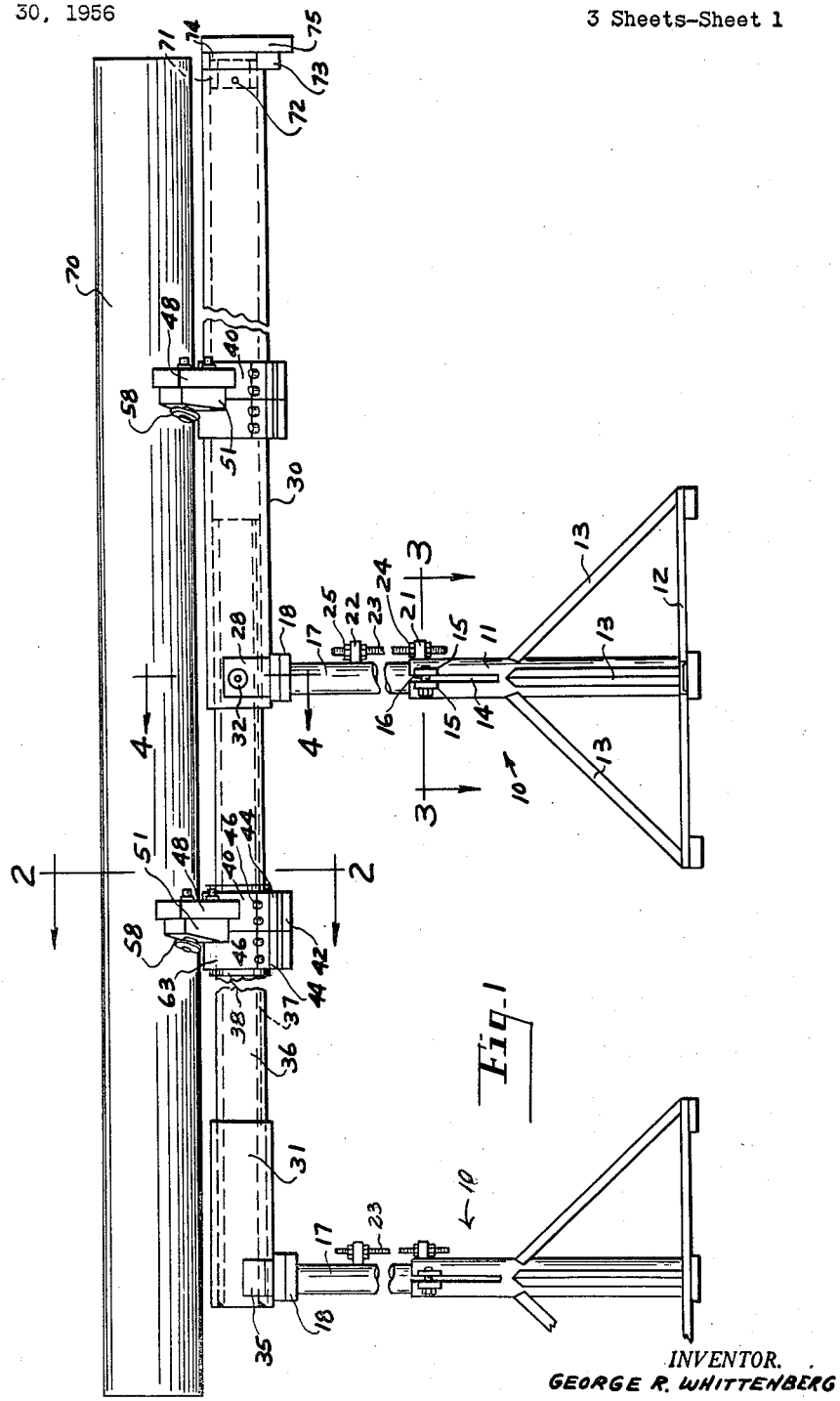
Fig. 1 is a side elevational view of the fixture.
Figure 5:
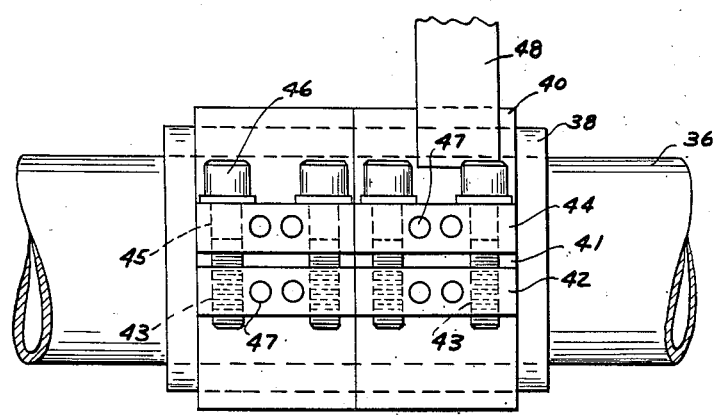
Fig. 5 is a side view of a structural detail as seen from line 5—5 of Fig. 2.

The fixture includes a plurality of standards, each of which is generally identified by numeral 10. As all the standards are identical, a description of one shown in Fig. 1, will pertain to others. The standard includes a tubular vertical stanchion 11 resting on a base composed of two crossed channel-type rails 12, and is braced in its vertical position by a plurality of props 13, preferably of angle-type structure, the props extending from the ends of the rails to said stanchion 11. The top portion of the stanchion is split longitudinally as shown at 14, each of the opposed edges of the split portion of said stanchion being provided with an ear 15. Each of the ears is provided with an aperture for reception of a bolt 16 by means of which the ears may be drawn towards each other.

Telescopically fitting into the stanchion from above, is a post 17, which at its upper end terminates with a horizontal platform 18, having a flat ground upper surface. The plate is preferably welded to the post as shown at 19 in Fig. 4. Welded to the outer surface of the stanchion 11 at the top thereof as shown at 20, is a square plate member 21, which is provided with a vertical bore. A similar member 22 is welded to the post 17 in a radial position thereto, said member being also provided with a bore which is in register with the bore in the first mentioned member 21. A long stud 23, which passes through both said bores and a pair of nuts seated upon the bolt and straddling each block, serves as a means of adjusting the elevation of said post 17, or more specifically of the platform 18.

Disposed upon the platform 18, in a floating relation thereto, is a base plate 26, its underside being ground flat for a sliding contact with the upper surface of the platform. Welded in place upon said base plate 26, as shown at 27, are two L-shaped brackets each of which includes a vertical member 28. The vertical members are disposed in a parallel relation to each other, but are sufficiently spaced from each other to bear from opposite sides against a horizontally extending tube 30, the outer surface of which is ground to a true circular form. Each vertical member 28 is provided with a transverse aperture 28a. Welded to each member on the side remote from the other member, is a collar 32, having an internally threaded bore which is in register with the transverse aperture in said member. Threaded through the collar and projecting through the aperture in the respective member 28, is a set screw 29, the screw terminating with a cone shaped tip which normally reaches into a funnel shaped cavity 33, in the surface of tube 30, as shown in Fig. 4.

The standard shown at left in Fig. 1 supports a length of a tube 31, which is of the same diameter as tube 30. Said tube 31 is held between two L-shaped brackets 35, and is held in place by being welded to said brackets.

Fitting into the interior of said tube 31, and welded to it against rotation, is one end of a tube 36, which, throughout its length, is provided with a key-way 37. At the other end, the said tube 36 fits into the interior of tube 30 for a sliding telescopic engagement therewith. Mounted upon said tube 36, in a coaxial relation thereto, is a short spacer 38, which is provided with an inwardly extending key 39, fitting into said key-way 37. The spacer is of the same diameter as said tubes 30 and 31. Clamped upon the spacer 38, are two work suporting members which are set at an angle to each other, the arrangement resulting in a formation of a V-shaped work supporting bracket. One of the bracket members first to be described includes a short sleeve 40, which is split transversely as shown at 41. Secured to each end of the sleeve along said split, is a radially extending bar. One of said bars, marked 42, is provided with a pair of internally threaded bores 43, while the other bar 44, contains a pair of smooth bores 45. Each bar, as shown in the drawings is secured to the collar by means of screws 47, the two bars being adapted to be drawn towards each other for the purpose of increasing the frictional grip of the collar upon said spacer 38. This is effected by means of bolts 46 which, passing through bores 45, are threaded into said bores 43.

Projeccting radially from the sleeve 40 at right angle to the bars 42 and 44, is an arm 48, which forms one member of the V-shaped bracket. The arm is provided with two oblong slots 49 on a line extending from said sleeve to the outer end of the arm. Mounted upon one side of said arm in a lateral relation to the work to be supported by the bracket, is a block 51. The block is supported by two bolts 50, which pass through the oblong slots in the arm, and are threaded into holes 52 on the block. In order to attain a straight linear movement of the block upon said arm 48, the latter is provided with a slideway 54, while the block includes a correspondingly shaped portion fitting into said slideway.

Numeral 56 indicates washers. Secured within the block and projecting outwardly therefrom, is a shaft 57, supporting a roller 58 which is mounted upon the shaft in such a manner that its peripheral portion will bear against the work to be carried by the bracket. It will be noted that the plane of rotation of the roller is set at an helix angle to said work.

Extending radially from the sleeve 40 in a diametrically opposite position to said arm 48, is a short stub 60, defined by a flat upper surface 61, which terminates with an upwardly rising shoulder 62.

I shall now refer to another component member of the V-shaped bracket, which member also includes a split sleeve 63, the latter being made in most details like said sleeve 40. Accordingly, said sleeve 40 is provided with two radial bars 42 and 44, the two bars being adapted to be drawn to each other by means of bolts 46.

Secured to the sleeve 63 in a radial relation thereto, and disposed at an angle to the arm 48, is an arm 48a which is identical with arm 48. More specifically, the arm 48a contains a slideway 54a for engagement with a sliding block 51a. The latter, a shaft 57a, and mounted thereon is a roller 58, which is set at a helix angle with respect to the work to be carried by the bracket. As in the case of the movable block 51, block 51a may be adjustably secured in a desired position by means of bolts 50a.

Figure 6:
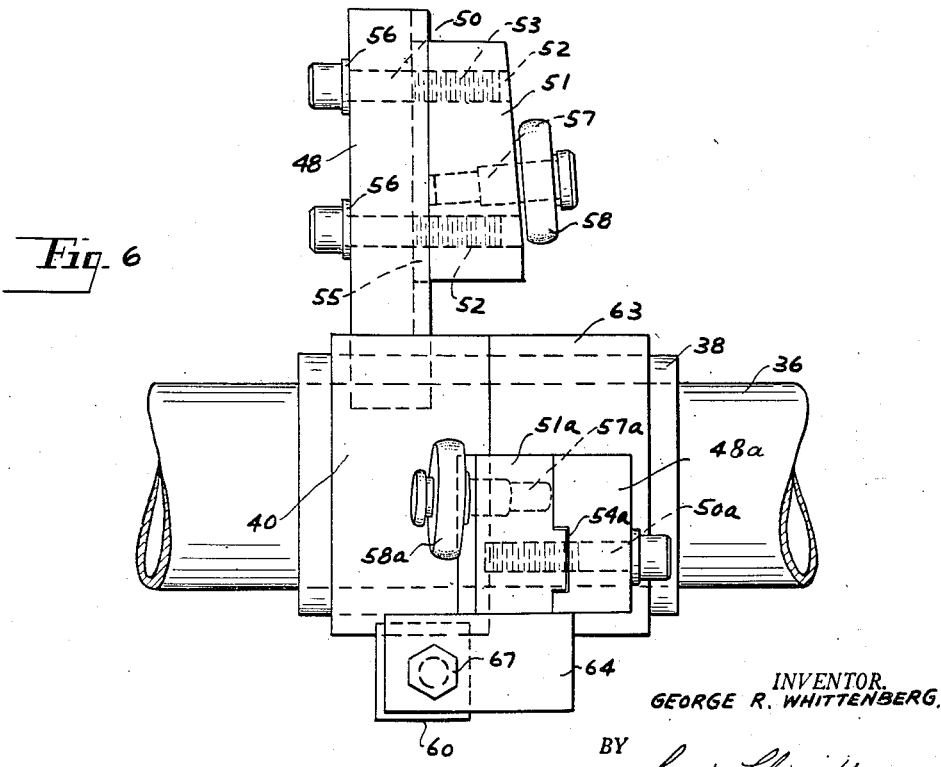
Fig. 6 is a view taken from line 6—6 in the direction of the structure show in Fig. 2.

Connected at right angle to arm 48a, and substantially parallel to stub 60, which extends radially from sleeve 40, is a horizontally disposed bar 64, which extends laterally over the flat face of said stub. This is shown in Figs. 2 and 6. The bar is provided with a threaded aperture 65 for reception of an adjusting screw 66, one end of which tetrminates with an angular head 67, while the other end bears against said face 61. Numeral 68 indicates a jam nut upon said bolt 66, the nut bearing against the upper surface of said bar 64.

As already stated herein, the arms 48 and 48a are set at an angle to each other so as to provide a V-shaped bracket, so that the work piece, such as a tube 70, will be disposed in a gap between the arms, and will be supported from opposite sides by the rollers 58 and 58a.

It will be understood that at one end, the fixture has to be secured to the frame work of the grinding machine. For this purpose, said tube 30 contains at that end of the fixture which is to be connected tot said frame, a short cylindrical insert 71. The insert is held in place in said tube by means of a radial pin 72 but projects, in part, out of the end of said tube. The outwardly projecting part of the insert fits into an aperture 74 in a holding plate 73, and is preferably welded thereto. The holding plate in turn is secured in a parallel abutting relation to an end plate 75, which may be provided with a plurality of holes for application of bolts for connection to the grinder, at the work receiving side thereof.

In order to describe the operation of the fixture, reference must be had to the fact that the grinder, which includes a grinding wheel and a control wheel, also includes a rest on which the work is supported in the course of the grinding operation. With this fact in mind, it will be understood that for operative use of the fixture, its V-shaped bracket must be first elevated to such a position that the work within the bracket will be held at the level of the support within the grinding machine.

This is effected in the first instance by means of the standards 10, in which the platform 18 may be adjusted vertically by means of the studs 23, and the nuts 25, which are associated therewith, and which, in pairs, straddle members 21 and 22 respectively.

A further adjustment has to be made within the bracket composed of two arms, 48 and 48a, between which rests the work supported on rollers 58 and 58a. As the diameters of work pieces supported by the rollers vary with individual tubes, it may be necessary to adjust the angle between the arms so as to support the work on the rollers, but out of touch with the tubes on which the brackets are mounted.

In order to effect this adjustment, it is first necessary that the grip of the sleeves 40 and 46 upon the supporting members be loosened. This is accomplished by a limited unscrewing of bolts 46. If the arms 48 and 48a are to be spread apart to accommodate a work of a size requiring such a spread, this may be effected by means of the screw 66, which at one end bears against the upper surface 61 of the stub 60. Once the arms have been spread to the desired angle with respect to each other, and the bolts have been tightened, the lower end of the screw 66 bearing against said stub will prevent the arms from spreading any further. Conversely, if it is desired to decrease the angle between the two arms, this may be effected by turning in the screw 66 so that the distance between the stub 60 and the member 64 on collar 63 will be increased.

With the increase or the decrease of the angle between the two arms 48 and 48a, it will be also necessary to adjust the positions of the rollers which are to bear against the work from opposite sides. This is effected by adjustment of the positions of the roller-carrying blocks 51 and 51a, longitudinally with relation to the respective arms. It is for this purpose that the bolts 50 in slots 49 are to be used, this being a common expedient which needs no further description.

As already stated, the work to be ground is rotated about its axis by a regulating wheel, and is moved axially by means within said grinder. As the work resting on the rollers within the fixture rotates about its axis, it imparts a rotary movement to each roller, and as the rollers are set helically at an angle to the work, they propel the work in a screw-like manner towards the grinder.

A similar fixture, provided with V-shaped brackets, including rollers of the kind described herein, is to be mounted at the delivery end of the grinder so that the work in a finished state may be carried on said rollers, outwardly from the grinder.

It will be understood that some changes may be made in the structure of the fixture described herein, without departing beyond the scope of the inventive concept disclosed herein. What I, therefore, wish to claim is as follows:

1. A fixture for use with a centerless grinding machine, the fixture including tubular means disposed horizontally, a plurality of standards for support thereof, a plurality of V-shaped brackets mounted on said tubular means in a spaced relation to each other, each bracket including two short sleeves mounted on said tubular means in end to end relation to each other, an arm radially extending from each sleeve, the arms being disposed in a V-shaped formation with respect to each other, a block longitudinally slidable on each arm, each block carrying a roller, the rollers on both arms being adapted to support a work piece within the gap between the two arms, means to adjust the position of each block on the respective arm, each roller being adapted to be rotated in a plane obliquely to the axis of the work piece resting thereon.

2. A fixture for use with a centerless grinding machine for the purpose of supporting a work piece to be ground by said machine, the fixture including horizontal tubular means in a straight line arrangement, a plurality of vertically adjustable standards for support of said tubular means, a plurality of V-shaped brackets for support of the work piece, each bracket comprising two short sleeves mounted coaxially on said tubular means in end to end abutment, each sleeve including a portion which is split transversely to form two opposed ends, screw means associated with said ends to draw them adjustably towards each other, an arm radially extending from each sleeve the arms being disposed in a V-shaped formation with respect to each other, a block longitudinally slidable on each arm, each arm carrying a roller, the rollers on both arms being adapted to support a work piece within the gap between the two arms, means to adjust the position of each block on the respective arm, each roller being adapted to be rotated in a plane obliquely to the axis of the work piece resting thereon.

3. A fixture for use with a centerless grinding machine for the purpose of supporting a work piece to be ground by said machine, the fixture including horizontal tubular means in a straight line arrangement, a plurality of vertically adjustable standards for support of said tubular means, a plurality of V-shaped brackets for support of the work piece, each bracket comprising two short sleeves mounted coaxially on said tubular means in end to end abutment, each sleeve being split transversely and being provided at the split portion with screw means to adjustably tighten the sleeve upon said tubular means, an arm extending radially from each sleeve in a V-formation with respect to each other, each arm having a longitudinal slideway therein, a movable block engaged with said slideway, bolt and nut means associated with said arm and said block to secure the block in a desired position upon said arm, and a roller mounted by intermediate means upon each block, the rollers being adapted to support the work piece from opposite directions, each of said rollers being adapted to be rotated in a plane obliquely to the axis of the work piece supported by the rollers.

4. A fixture for use with a centerless grinding machine for the purpose of supporting a work piece to be ground by said machine, the fixture including horizontal tubular means in a straight line arrangement, a plurality of vertically adjustable standards for support of said tubular means, a plurality of V-shaped brackets for support of the work piece, each bracket comprising two short sleeves mounted coaxially on said tubular means in end to end abutment, each sleeve being split transversely and being provided at the split portion with screw means to adjustably tighten the sleeve upon said tubular means, an arm extending radially from each sleeve in a V-formation with respect to each other, each arm having a longitudinal slideway therein, a movable block engaged with said slideway, a bolt and nut means associated with said arm and said block to secure the block in a desired position upon said arm, and a roller mounted by intermediate means upon each block, the rollers being adapted to support the work piece from opposite directions, each of said rollers being adapted to be rotated in a plane obliquely to the axis of the work piece supported by the rollers, one of the sleeves being provided with a stub extending radially therefrom in a diametrically opposed relation to the arm extending from said sleeve, the other sleeve being provided with a bar extending laterally over said stub, and a screw threaded through an aperture in said laterally extending bar and bearing against the stub therebelow to adjust the angle of spread of said arms.

5. A fixture as defined in Fig. 4, in which the horizontal means supporting V-shaped brackets, comprise a plurality of tubes in a telescopic relation to each other.

6. A work supporting bracket for centerless grinders, the bracket comprising two component members, each including a split sleeve adapted to embrace frictionally a horizontally disposed tubular support, a radial arm extending from each sleeve, the two arms forming a V-shaped structure, means on each sleeve to adjust the frictional embrace thereof upon the support, a block mounted upon each arm for a longitudinal movement thereon, means to secure each block in a selected position, longitudinally, upon the respective arm, a roller carried on each block, the rollers being adapted to support work from opposite sides, each roller being adapted to be rotated in a plane set obliquely to the work, one sleeve being provided with a stub radially extending therefrom, the stub being defined in part by an upper face, the other sleeve being provided with a laterally extending bar, having a transverse threaded bore therein, a screw disposed in said bore, and bearing against the upper face of the stub, the screw and the stub serving as means of adjusting the spread between the two arms of the bracket and keeping them at a selected angle with respect to each other.

References Cited in the file of this patent
UNITED STATES PATENTS

| | | |
|---|---|---|
| 1,713,678 | Seibert | May 21, 1929 |
| 2,165,097 | Fuller | July 4, 1939 |
| 2,284,257 | Bergstrom | May 26, 1942 |
| 2,332,528 | Rauschenberger | Oct. 26, 1943 |
| 2,754,640 | Fuller et al. | July 17, 1956 |